US011310057B2
US 11,310,057 B2

(12) United States Patent
Chen

(10) Patent No.: US 11,310,057 B2
(45) Date of Patent: Apr. 19, 2022

(54) PREVENTING EXPLOITATION OF SERVERLESS-FUNCTION FLOWS

(71) Applicant: RED HAT, INC., Raleigh, NC (US)

(72) Inventor: Huamin Chen, Westboro, MA (US)

(73) Assignee: Red Hat, Inc., Raleigh, NC (US)

( * ) Notice: Subject to any disclaimer, the term of this patent is extended or adjusted under 35 U.S.C. 154(b) by 145 days.

(21) Appl. No.: 16/682,744

(22) Filed: Nov. 13, 2019

(65) Prior Publication Data
US 2021/0144013 A1 May 13, 2021

(51) Int. Cl.
| H04L 9/32 | (2006.01) |
| H04L 29/06 | (2006.01) |
| H04L 29/08 | (2006.01) |
| G06F 8/60 | (2018.01) |
| H04L 67/10 | (2022.01) |
| H04L 67/51 | (2022.01) |

(52) U.S. Cl.
CPC .............. H04L 9/3247 (2013.01); G06F 8/60 (2013.01); H04L 63/08 (2013.01); H04L 67/10 (2013.01); H04L 67/16 (2013.01)

(58) Field of Classification Search
None
See application file for complete search history.

(56) References Cited

U.S. PATENT DOCUMENTS

| 2014/0282849 A1* | 9/2014 | Collison ............... H04W 12/68 726/1 |
| 2018/0270107 A1* | 9/2018 | Nassar ................. H04L 41/0686 |
| 2019/0028552 A1 | 1/2019 | Johnson, II et al. |
| 2019/0075154 A1 | 3/2019 | Zhang et al. |
| 2019/0149480 A1 | 5/2019 | Singhvi et al. |
| 2019/0273746 A1* | 9/2019 | Coffing .................. H04L 63/105 |
| 2020/0052982 A1* | 2/2020 | Nainar ................... H04L 43/028 |
| 2021/0036925 A1* | 2/2021 | Boddam ............. H04L 41/5019 |

OTHER PUBLICATIONS

Chard, R., et al., "Serverless Supercomputing: High Performance Function as a Service for Science," Argonne National Laboratory; University of Chicago, Aug. 14, 2019, https://arxiv.org/pdf/1908.04907.pdf.

(Continued)

*Primary Examiner* — Jonathan A Bui
*Assistant Examiner* — Mohammad Yousuf A. Mian
(74) *Attorney, Agent, or Firm* — Kilpatrick Townsend & Stockton LLP

(57) ABSTRACT

One exemplary system described herein can detect a first request associated with invoking a serverless function in a sequence of serverless functions. In response, the system can deploy a primary container and a secondary container in a cloud computing environment. The primary container can execute the serverless function and transmit a second request for invoking a second serverless function in the sequence. The secondary container can intercept the second request and generate a modified second request. The secondary container can then transmit the modified second request to a destination other than an endpoint of the second serverless function, where the destination can cause the second serverless function to be executed in response to receiving the modified second request.

20 Claims, 4 Drawing Sheets

(56) References Cited

OTHER PUBLICATIONS

Van Eyk, Erwin, "Four Techniques Serverless Platforms Use to Balance Performance and Cost," Feb. 13, 2019, https://www.infoq.com/articles/serverless-performance-cost/.
Grumuldis, Algirdas, "Evaluation of "Serverless" Application Programming Model—How and when to start Serverless," KTH Royal Institute of Technology, Sweden, 2019, https://pdfs.semanticscholar.org/79e7/b19d135906db88147921769a82caff46ec98.pdf.
Roberts, Mike, "Serverless Architectures," May 22, 2018, https://martinfowler.com/articles/serverless.html.
Yasskin, J., "Signed HTTP Exchanges," Google, 2019, https://wicg.github.io/webpackage/draft-yasskin-http-origin-signed-responses.html.

* cited by examiner

PREVENTING EXPLOITATION OF SERVERLESS-FUNCTION FLOWS

TECHNICAL FIELD

The present disclosure relates generally to serverless function execution. More specifically, but not by way of limitation, this disclosure relates to preventing exploitation of serverless-function flows.

BACKGROUND

Cloud computing environments have recently grown in popularity. Cloud computing environments have a shared pool of computing resources (e.g., servers, storage, and virtual machines) that are used to provide services to developers on demand. These services are generally provided according to a variety of service models, such as Infrastructure as a Service (Iaas), Platform as a Service (PaaS), or Software as a Service (SaaS). But regardless of the service model, cloud providers manage the physical infrastructures of the cloud computing environments to relieve this burden from developers, so that the developers can focus on deploying applications.

Some cloud providers have recently began to implement serverless computing capabilities within their cloud computing environments. For example, Amazon Web Services (AWS) has developed a service referred to as Amazon® AWS Lambda that provides a cloud computing environment with serverless computing capabilities. Serverless computing enables developers to execute code without the developer having to consider how to provision the appropriate computing resources for the code. For example, a developer can upload code to a serverless computing environment (i.e., a cloud computing environment with serverless computing capabilities), and the serverless computing environment will automatically provision the computing resources required to run the code and scale to meet demand, without burdening the developer with those details. Since this setup and scaling is completely hidden and abstracted from the developer, the computing environment appears to be "serverless" to the developer, despite it actually including one or more physical or virtual servers (and thus the term "serverless" is somewhat of a misnomer). In a typical serverless computing arrangement, the developer only pays the cloud provider for the computing time consumed by the execution of the code.

One type of code developed for implementation in a serverless computing environment is a serverless function, such as a Lambda function in AWS Lambda. A serverless function is generally an ephemeral, self-contained, discrete piece of code (e.g., set of logic or operations) configured to perform a particular task when executed in a serverless computing environment and then become dormant when execution completes. Serverless functions can be triggered in response events occurring in a serverless computing environment, such as the receipt of a hypertext transfer protocol (HTTP) request, and in some cases each serverless function may execute within a container (e.g., a substantially isolated virtual environment) to remain isolated from the other serverless functions. Given that each individual serverless function is independently executable from the other serverless functions, and that the developers are typically charged based on the computing time consumed by each individual serverless function, sometimes this service model is referred to as Function as a Service (FaaS).

DETAILED DESCRIPTION

Figure 1:
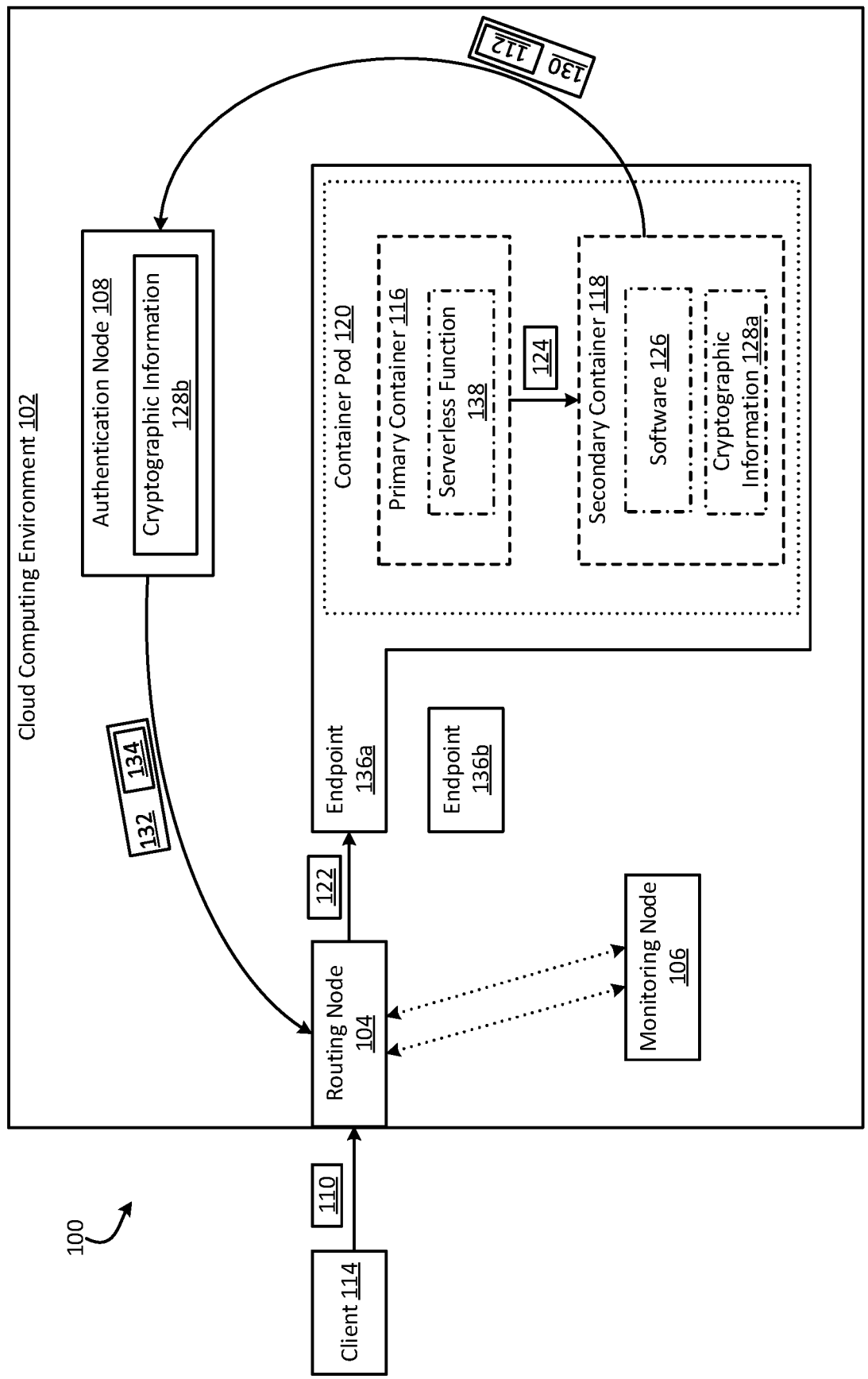
FIG. 1 is a block diagram of an example of a system for preventing exploitation of serverless-function flows according to some aspects of the present disclosure.

Serverless functions can be triggered synchronously or asynchronously in predefined combinations to collectively implement distributed applications (as opposed to monolithic applications). These distributed applications often involve a predefined sequence of serverless functions that are chained together in a specific order that implements the overall application logic, where each serverless function triggers the next serverless function in the chain by communicating with an endpoint for the next serverless function. For example, a chain of serverless functions can include serverless functions A, B, C, . . . , N. When serverless function A finishes executing, it will trigger serverless function B by transmitting an invocation request to an endpoint for serverless function B. And when serverless function B finishes executing, it will trigger serverless function C by transmitting an invocation request to an endpoint for serverless function C. And so on. The order of invocation may be critical for achieving the desired application logic. However, since the endpoints for the various serverless functions are often left "exposed" and the serverless functions are invoked by external invocation requests, malicious actors that find these endpoints may be able to manipulate the flow (e.g., invocation order) of the serverless functions in undesirable ways, for example, to gain privileged control over the system.

Some examples of the present disclosure can overcome one or more of the abovementioned issues by implementing an iterative cycle that validates each serverless function in a chain of serverless functions to avoid flow manipulation. The cycle can involve a system receiving a request for invoking a chain of serverless functions. In response, the system can cause a first serverless function in the chain to be invoked in a primary container. A primary container is a container that is configured for executing a requested service, such as the serverless function. The system can also cause a secondary container to be deployed in association with the primary container. A secondary container is a container that is independent of the primary container, but is "coupled" to the primary container such that it can actively participate in the flow of information to and/or from the primary container and its services. Once deployed, the secondary container can detect that the primary container is attempting to transmit an invocation request for the next serverless function in the chain (e.g., once the current serverless function has completed executing), intercept the invocation request, apply a digital signature to it, and then reroute the digitally signed invocation-request to an authentication node. The authentication node can validate the digital signature before rerouting the invocation request for the next serverless function back to the routing node, which restarts the whole cycle for the next serverless function.

Using the above iterative approach, each invocation request is intercepted and validated based on a secure digital signature (e.g., known only to the system) before the next serverless function is allowed to execute. This can prevent each serverless function in the chain from directly invoking the next serverless function in the chain, which minimizes the ability of malicious actors to manipulate the flow of the serverless functions.

While some examples of the present disclosure are described with respect to serverless functions in a serverless computing environment, other examples can involve other types of services configured to implement distributed applications. Such services may either be part of a serverless computing environment or another type of computing environment. For instance, microservices have several characteristics in common with serverless functions that may make them susceptible to flow manipulation. Generally, microservices are self-contained, discrete, stateless services that are configured to perform a particular task. Microservices are often executed in specific orders to perform the overall logic for distributed applications. As a result, the enhanced security procedure described herein may be similarly applicable to a sequence of microservices to prevent flow manipulation between those microservices.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for preventing exploitation of serverless-function flows according to some aspects of the present disclosure. In this example, the system 100 includes a cloud computing environment 102 with serverless computing capabilities—i.e., a serverless computing environment. The cloud computing environment 102 includes a routing node 104, a monitoring node 106, and an authentication node 108 that can collectively work together to implement some aspects of the present disclosure.

The routing node 104 is configured to receive requests from clients for executing services (e.g., serverless functions or microservices) and route the requests to appropriate endpoints. An endpoint is a node with a runtime environment configured for running a service. Endpoints can be internal or external to the cloud computing environment 102, even though endpoints 136a-b are both depicted in FIG. 1 as being internal to the cloud computing environment 102. The routing node 104 can route the requests for executing services to the appropriate endpoints based on based on predefined rules. For example, the routing node 104 may include predefined mappings between services and endpoints for the services. When the services are serverless functions, and the routing node 104 is configured to route requests for the serverless functions to their appropriate destinations, the routing node 104 can be referred to as a "function router."

In the example shown in FIG. 1, the routing node 104 receives a first request 110 from a client 114. A client is any hardware device or software application seeking to execute a service in the cloud computing environment 102, and clients may be internal or external to the cloud computing environment 102. The first request 110 can be an HTTP request or another type of request. The first request 110 can be associated with invoking a serverless function 138. For example, the first request 110 can be for invoking a predefined sequence of serverless functions that collectively implements at least part of a distributed application, where the predefined sequence of serverless functions includes the serverless function 138. The distributed application can a stateful application or a stateless application. A stateful application maintains data about a client session and reuses that data the next time the client 114 makes a request, whereas a stateless application does not save client data generated in one session for use in the next session with the client 114. Regardless of the type of distributed application, the routing node 104 can receive the first request 110 and determine an appropriate endpoint 136a for the serverless function 138.

The system also includes the monitoring node 106. The monitoring node 106 can determine that the routing node 104 received the first request 110. In some examples, the monitoring node 106 can determine that the routing node 104 received the first request 110 by detecting a corresponding event triggered by the routing node 104. For example, the routing node 104 may implement a webhook that posts an HTTP message to a uniform resource locator (URL) address in response to receiving requests, where such a webhook post constitutes an event. The monitoring node 106 may monitor the URL address for such webhook events and determine that the routing node 104 received the first request 110 in response to detecting such a webhook event. In other examples, the routing node 104 may transmit other types of messages (e.g., via a messaging system like Cloud PubSub by Google®) that are indicative of the received requests. The monitoring node 106 can detect such messages and determine that the routing node 104 received the first request 110 based on those messages. Either way, the monitoring node 106 can cooperate with the routing node 104, as represented by the dotted arrows in FIG. 1, to determine that the routing node 104 received the first request 110.

In response determining that the routing node 104 received the first request 110, the monitoring node 106 can perform one or more operations. For example, the monitoring node 106 can generate a modified first request 122 based on the first request 110, e.g., prior to the first request 110 being forwarded by the routing node 104 to its designated endpoint 136a. Generating a "modified X request" based on X request can involve applying updates to X request itself or creating a new request with the updates based on X request. As another example, the monitoring node 106 can instruct another component (e.g., the routing node 104) of the cloud computing environment 102 to generate the modified first request 122. Either way, the monitoring node 106 can cause the modified first request 122 to be generated based on the first request 110.

The modified first request 122 can be configured to cause the endpoint 136a to deploy two containers—a primary container 116 and a secondary container 118—rather than just the primary container 116, as is typically the case absent intervention by the monitoring node 106. For example, the modified first request 122 can have a header configured to cause the endpoint 136a to deploy the secondary container 118 in conjunction with the primary container 116. The secondary container 118 can be any type of container, such as a "sidecar" container, that is suitably "coupled" to the primary container 116. A sidecar container shares the same lifecycle as its primary container and has access the same resources as its primary container.

To effectuate the desired coupling between the primary container 116 and the secondary container 118, in some examples the modified first request 122 is configured to for causing the two containers to be deployed together in a container pod 120, such as a Kubernetes™ pod. A container pod includes multiple co-located containers that share storage and network resources, where all of the containers in the pod run in a shared context (e.g., a set of Linux namespaces, cgroups, and potentially other facets of isolation).

After generating the modified first request 122, the system 100 can transmit the modified first request 122 to the appropriate endpoint. For example, the routing node 104 or the monitoring node 106 can transmit the modified first request 122 to endpoint 136a. The endpoint 136a can receive the modified first request 122 and responsively deploy the primary container 116 and the secondary 118 as specified in the modified first request 122 (e.g., in container pod 120). The endpoint 136a can deploy the primary container 116 and the secondary container 118 internally to itself (e.g., as shown in FIG. 1), internally to the cloud computing environment 102 but externally to itself, or in any other suitable location.

Once deployed, the primary container 116 can then execute the serverless function 138. As a result of executing the serverless function 138 (e.g., upon completion of the serverless function 138), the primary container 116 can output a second request 124. The second request 124 can be an HTTP request or another type of request. The second request 124 can be configured to invoke the next serverless function in the predefined sequence of serverless function. For example, the second request 124 can be destined for (e.g., have a destination address corresponding to) an endpoint 136b of the next serverless function.

In some examples, the secondary container 118 can execute software 126 that intercepts the second request 124 before the second request 124 can reach its intended destination. The software 126 can then generate a modified second request 130 based on the second request 124. The modified second request 130 can include a digital signature 112. A digital signature can include an encrypted hash value generated using cryptographic information, such as a digital certificate associated with an asymmetric key pair. For enhanced security, the cryptographic information 128a for generating the digital signature 112 can be kept internal to the cloud computing environment 102. For example, the cryptographic information 128a can be maintained internally to the secondary container 118. In some such examples, the monitoring node 105 can provide the cryptographic information 128a to the secondary container 118, which can store and use the cryptographic information 128a to generate the digital signature 112. Alternatively, the cryptographic information 128a can be maintained elsewhere in the cloud computing environment 102, from which the monitoring node 106 can obtain the cryptographic information 128a, generate the digital signature 112 based on the cryptographic information 128a, and supply the generated digital signature 112 to the secondary container 118 for inclusion in the modified second request 130.

The modified second request 130 can additionally or alternatively include an identifier usable to invoke the next serverless function. In some examples, the identifier can identify the endpoint 136b configured to invoke the next serverless function. For example, the secondary container 118 can determine a unique address for the endpoint 136b based on a header of the second request 124, e.g., by extracting the destination address from the header of the second request 124, where the destination address is the unique address for the endpoint 136b. In other examples, the identifier can uniquely identify the next serverless function from among all serverless functions in the predefined sequence of serverless functions. For instance, the secondary container 118 can map the unique address for the endpoint 136b to a unique identifier of the next serverless function using a predefined set of mappings. Either way, the secondary container 118 can incorporate the identifier usable to invoke the next serverless function into the modified second request 130.

After generating the modified second request 130, the system 100 transmits the modified second request 130 to a destination other than endpoint 136b. The destination may be internal or external to the cloud computing environment 102. For example, the destination can be the authentication node 108. The secondary container 118 can transmit the modified second request 130 to authentication node 108. The authentication node 108 can receive the modified second request 130 and validate its digital signature 112. If the authentication node 108 determines that the digital signature 112 is invalid, the authentication node 108 can flag the modified second request 130 as untrustworthy and prevent the next serverless function from being executed. If the authentication node 108 determine that the digital signature 112 is valid, the authentication node 108 can generate a third request 132 based on the modified second request 130. The third request 132 can be a further modified version of the modified second request 130, or can be a new request that is based on the modified second request 130. Either way, the third request 132 can include the identifier (usable for invoking the next serverless function) set forth in the modified second request 130. The authentication node 108 may also add a digital signature 134 to the third request 132. The authentication node 108 can generate the digital signature 134 from cryptographic information 128b, which may be kept internal to the cloud computing environment 102 for enhanced security. The digital signature 134 of the third request 132 can be different from the digital signature 112 of the second request 130, and the cryptographic information 128b can be different from the cryptographic information 128a. The authentication node 108 can then transmit the third request 132 to the routing node 104. For example, the authentication node 108 can be part of a messaging system (e.g., Cloud PubSub by Google®) for enabling nodes of the cloud computing environment 102 to transmit messages to one another. So, the authentication node 108 can transmit the third request 132 as a message via the messaging system to the routing node 104, which can listen for such messages from the messaging system.

The routing node 104 can receive the third request 132 and validate its digital signature 134. If the routing node 104 determines that the digital signature 134 is invalid, the routing node 104 can flag the third request 132 as untrustworthy and prevent the next serverless function from being executed. If the routing node 104 determines that the digital signature 134 is valid, the routing node 104 can enable the next serverless function to be executed. As a result, the authentication node 108 has now become the client and the process is repeated for the next serverless function (e.g., the monitoring node 106 can detect and modify the third request 132, so that a primary and secondary container are deployed for the next serverless function, and so on). This process can keep repeating until all of the serverless functions in the sequence have been executed.

While the above example involves the secondary container 118 transmitting the modified second request 130 to authentication node 108, other examples may involve a different process. For instance, in an alternative example the secondary container 118 may transmit the modified second request 130 to (e.g., directly to) the routing node 104. In response, the routing node 104 can validate the digital signature 112 of the modified second request 130 in a similar manner to that discussed above, and enable execution of the next serverless function based on the validity of the digital signature 112. As a result, the authentication node 108 and the third request 132 may be excluded in such an example.

Although FIG. 1 depicts a particular arrangement of nodes (e.g., nodes 104, 106, and 108), other examples may have more, fewer, or a different arrangement of the nodes shown in FIG. 1. For instance, the system 100 may include a single node that combines the functionality of the routing node 104 and monitoring node 106 in another example. And although the nodes of FIG. 1 are described herein as performing certain functionality for illustrative purposes, that functionality can be alternatively performed by any number and combination of the nodes. For example, the routing node 104 may be able to perform at least some of the functionality of the monitoring node 106 and/or the authentication node 108 described herein. Similarly, the monitoring node 106 may be able to perform at least some of the functionality of the routing node 104 and/or the authentication node 108 described herein. Likewise, the authentication node 108 may be able to perform at least some of the functionality of the routing node 104 and/or the monitoring node 106 described herein.

Figure 2:
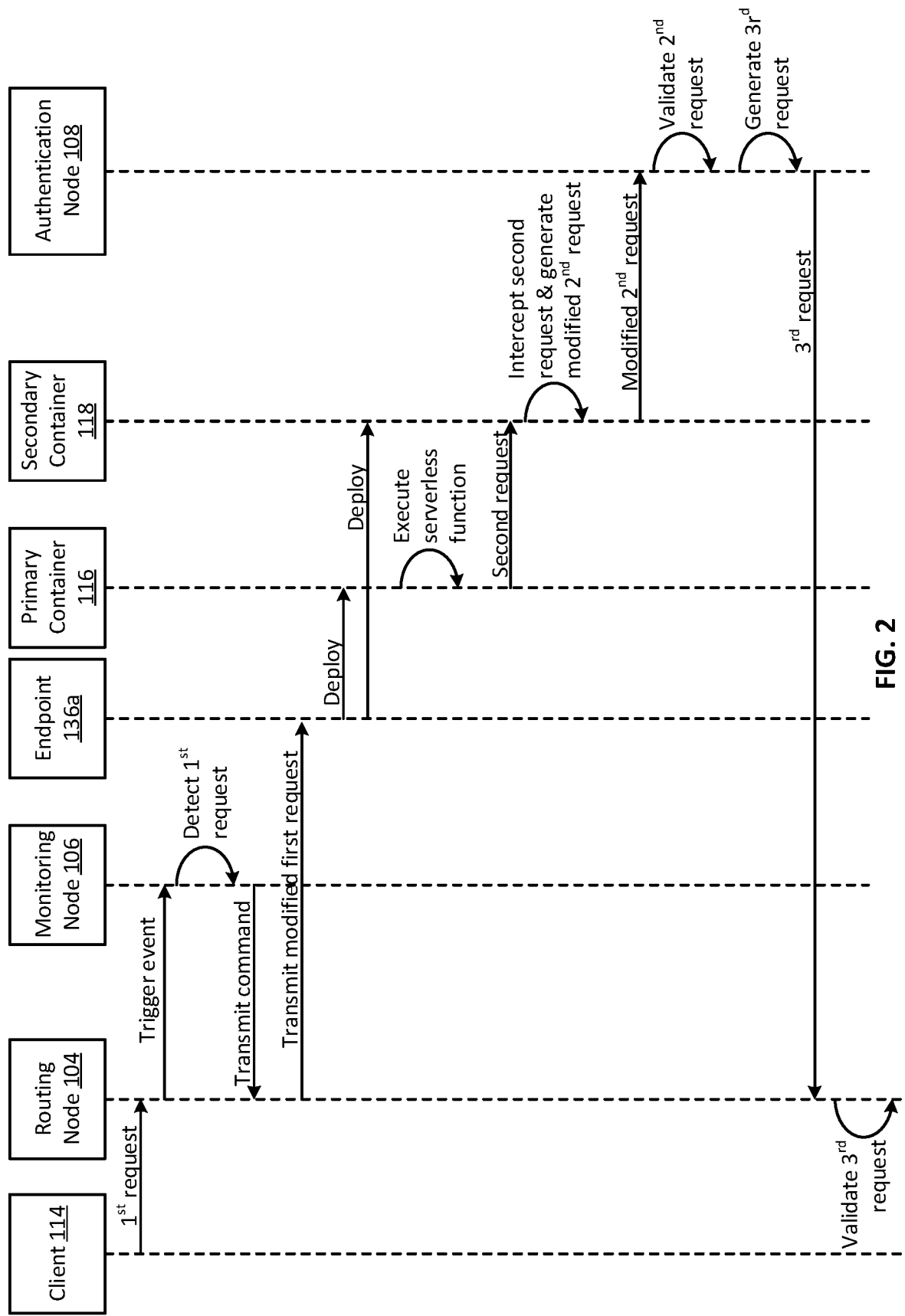
FIG. 2 is a sequence diagram of an example of a process for preventing exploitation of serverless-function flows according to some aspects of the present disclosure.

FIG. 2 is a sequence diagram of an example of a process for preventing exploitation of serverless-function flows according to some aspects of the present disclosure. In other examples, the process can have more steps, fewer steps, different steps, or a different order of the steps depicted in FIG. 2. The steps of FIG. 2 are described below with reference to the components of FIG. 1.

The process beings with a client 114 transmitting a first request 110 to the routing node 104. The first request 110 is associated with executing a serverless function in a predefined sequence of serverless functions. In response to receiving the first request 110, the routing node 104 triggers an event that is detectable by the monitoring node 106. The monitoring node 106 detects the event and transmits a command to the routing node 104 for causing the routing node 104 to generate a modified first request 122. The routing node 104 then transmits the modified first request 122 to the endpoint 136a associated with the serverless function. Alternatively, the monitoring node 106 can itself generate the modified first request 122 and transmit the modified first request 122 to the endpoint 136a associated with the serverless function. Either way, the endpoint 136 receives the modified first request 122 and responsively deploys a primary container 116 and a secondary container 118 that is coupled to the primary container 116.

Once deployed, the primary container 116 executes the serverless function and generates a second request 124 as a result thereof. The second request 124 is associated with the next serverless function in the predefined sequence of serverless functions. The secondary container 118 can detect and intercept the second request 124, generate a modified second request 130 based on the second request 124, and transmit the modified second request to the authentication node 108. The modified second request 130 can include a digital signature 112 for validation. The authentication node 108 can validate the digital signature 112 and, if it is valid, generate a third request 132 based on the modified second request 130. The third request 132 can include a digital signature 134 that is different from the digital signature 112 of the modified second request 130. The authentication node 108 can then transmit the third request 132 to the routing node 104, which can validate the digital signature 134 of the third request 132. If the digital signature 134 is valid, the routing node 104 can enable the next serverless function to be executed. For example, routing node 104 can again trigger an event detectable by the monitoring node 106, in order to begin the process of invoking the next serverless function. This process can be repeated until all of the serverless functions in the predefined sequence have been executed.

Figure 3:
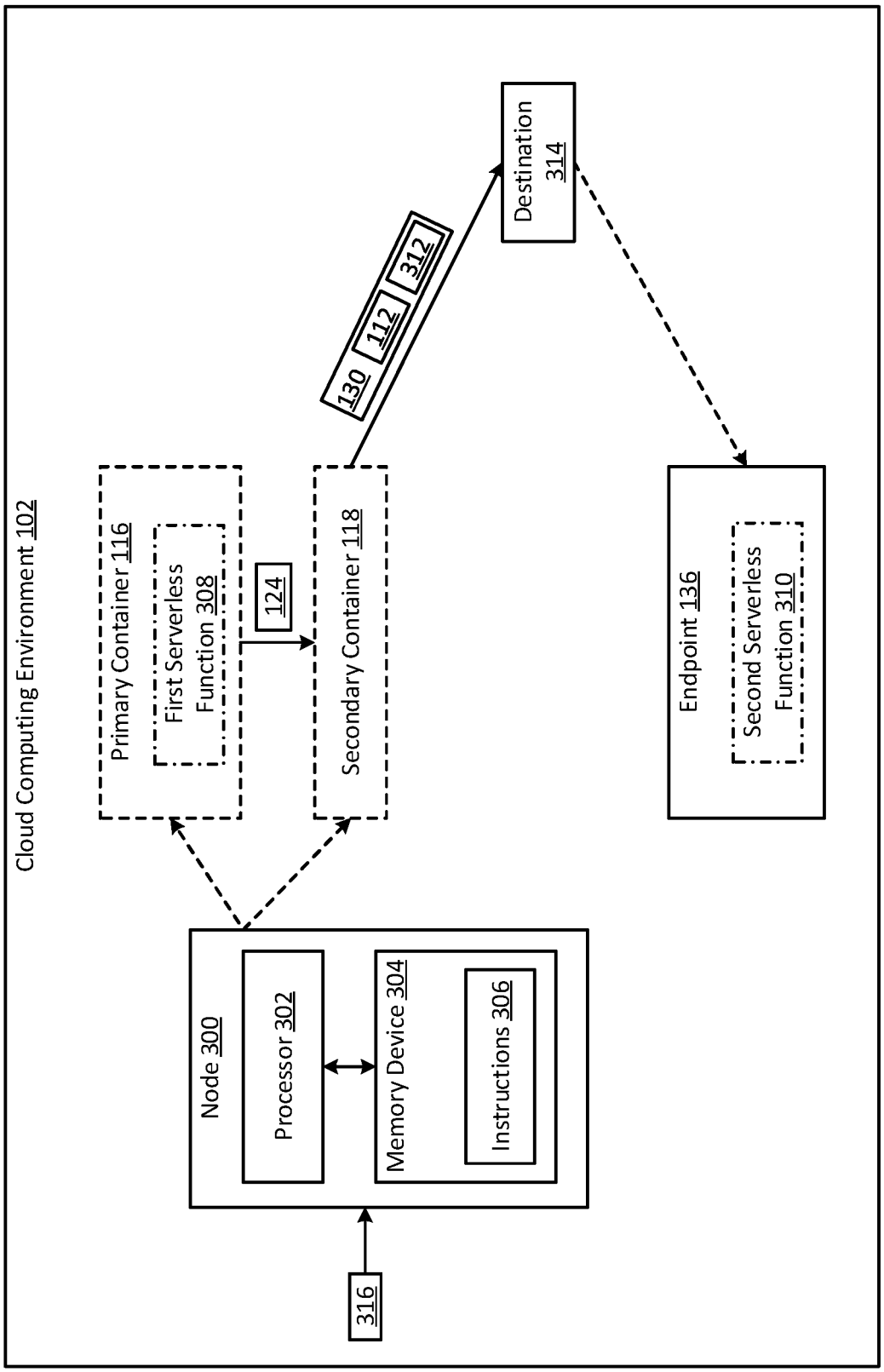
FIG. 3 is a block diagram of another example of a system for preventing exploitation of serverless-function flows according to some aspects of the present disclosure.

FIG. 3 is a block diagram of another example of a system for preventing exploitation of serverless-function flows according to some aspects of the present disclosure. The system includes a node 300 of a cloud computing environment 102. In some examples, the node 300 may serve as the routing node 104, the monitoring node 106, or the endpoint 136a of FIG. 1.

The node 300 includes a processor 302 communicatively coupled to a memory device 304. The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory device 304 to perform operations. In some examples, the instructions 306 can include processor-specific instructions generated by a compiler or an interpreter from code written in any suitable computer-programming language, such as C, C++, C#, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. At least some of the memory device includes a non-transitory computer-readable medium from which the processor 302 can read instructions 306. A non-transitory computer-readable medium can include electronic, optical, magnetic, or other storage devices capable of providing the processor 302 with the instructions 306 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 306.

The node 300 can cause a primary container 116 and a secondary container 118 to be deployed in the cloud computing environment 102. This causation is indicated in FIG. 3 by dashed arrows between the node 300, primary container 116, and secondary container 118. The primary container 116 can be configured to execute a first serverless function 308.

In some examples, the node 300 may cause the primary container 116 and the secondary container 118 to be deployed in response to detecting a first request 318 associated with invoking the first serverless function 308. The first serverless function 308 can be part of a predefined sequence of serverless functions, which may be configured to implement at least part of a distributed application.

Once the primary container 116 has been deployed, the secondary container 118 can intercept a second request 124 transmitted from the primary container 116 (e.g., as a result of executing the first serverless function 308). The second request 124 can be configured to invoke a second serverless function 310 in the predefined sequence of serverless functions. The second request 124 may be destined for an endpoint 136 of the second serverless function 310 prior to being intercepted.

After intercepting the second request 124, the secondary container 118 can generate a modified second request 130 based on the second request 124. In some examples, the modified second request 130 can include a digital signature 112, an identifier 312 usable to invoke the second serverless function 310, or both of these. The secondary container 118 can then transmit the modified second request 130 to a destination 314 other than the endpoint 136 of the second serverless function. For example, the destination 314 can be the authentication node 108 or the routing node 104 of FIG. 1. The destination 314 can cause the second serverless function 310 to be executed, for example, after validating the digital signature 112. This causation is indicated in FIG. 3 by a dashed arrow between destination 314 and endpoint 136.

While the node 300 was described above as performing certain functionality for illustrative purposes, in other examples the node 300 can perform more, less, or different functionality than that described above. For instance, the node 300 may perform any combination of the functionality of the nodes 104, 106, 108 and/or endpoints 136a-b of FIG. 1, in some examples.

Figure 4:
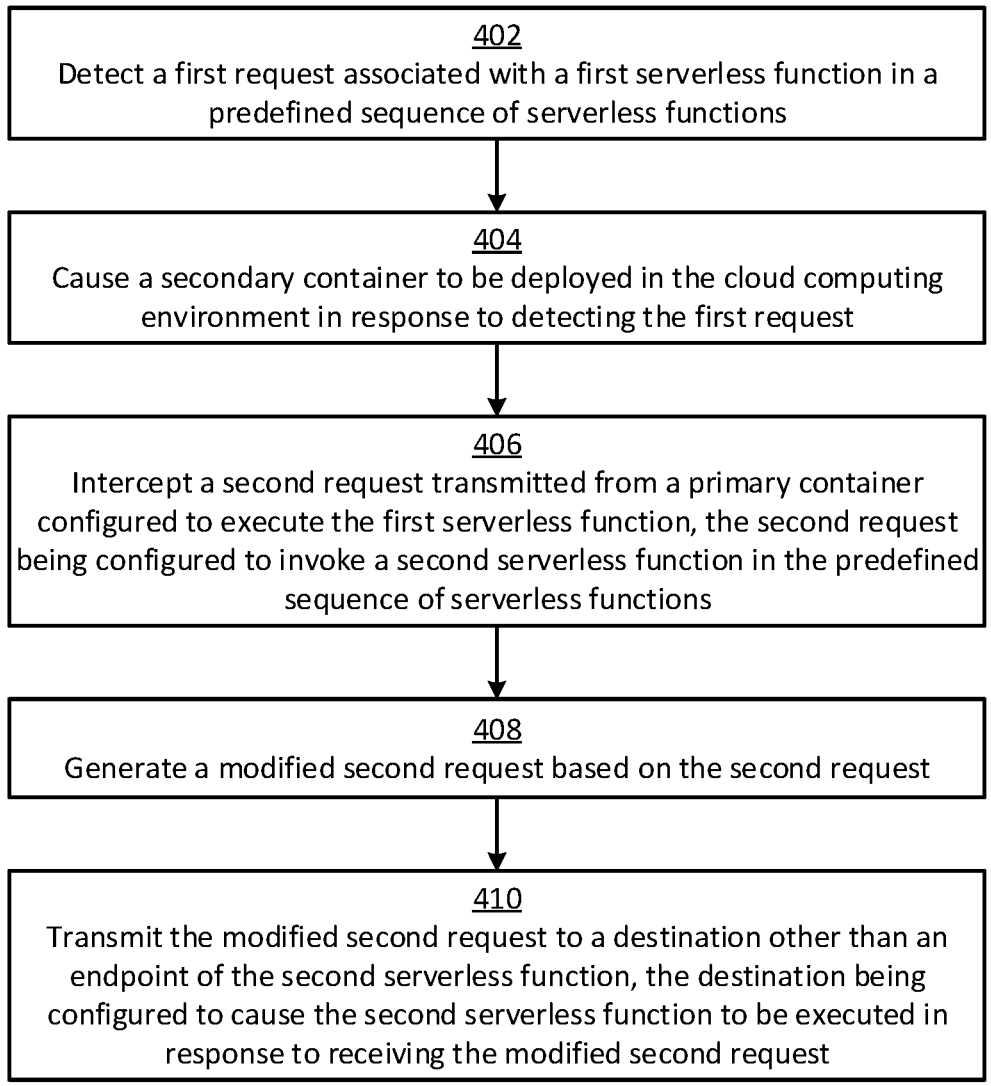
FIG. 4 is a flow chart of another example of a process for preventing exploitation of serverless-function flows according to some aspects of the present disclosure.

FIG. 4 is a flow chart of another example of a process for preventing exploitation of serverless-function flows according to some aspects of the present disclosure. While FIG. 4 depicts a certain sequence of steps for illustrative purposes, other examples can involve more steps, fewer steps, different steps, or a different order of the steps depicted in FIG. 4. The steps of FIG. 4 are described below with reference to components of FIG. 3.

In block 402, a node 300 detects a first request 318 associated with a first serverless function 308 in a predefined sequence of serverless functions. The predefined sequence of serverless functions may be configured to implement at least part of a distributed application.

In one example, the first request 316 can be similar to the first request 110 of FIG. 1. In such an example, the node 300 may be serving as a routing node, such that the node 300 can detect the first request 316 by receiving the first request 316 from a client. Alternatively, the node 300 may be serving as a monitoring node, such that the node 300 can detect the first request 316 based on an event (e.g., a webhook event) associated with the first request 316. In another example, the first request 316 can be similar to the modified first request 122 of FIG. 1. In such an example, the node 300 may be serving as an endpoint, such that the node 300 can detect the first request 316 by receiving the first request 316 from a routing node.

In block 404, the node 300 causes a secondary container 118 to be deployed in a cloud computing environment 102 in response to detecting the first request 316. For example, the node 300 can cause the secondary container 118 to be deployed in the cloud computing environment 102 in response to determining that the cloud computing environment 102 received the first request 316 associated with the first serverless function 308 in the predefined sequence of serverless functions. The secondary container 118 can be deployed such that it is associated with a primary container 116 configured to execute the first serverless function 308.

In block 406, the secondary container 118 intercepts a second request 124 transmitted from a primary container 116, where the primary container 116 is configured to execute the first serverless function 308. The second request 124 may be transmitted from the primary container 116 as a result of executing the first serverless function 308. The second request 124 can be configured to invoke a second serverless function 310 in the predefined sequence of serverless functions. The second request 124 may be destined for an endpoint 136 of the second serverless function 310 prior to being intercepted.

In block 408, the secondary container 118 generates a modified second request 130 based on the second request 124. The modified second request 130 can include a digital signature 112 and/or an identifier 312 usable to invoke the second serverless function 310.

In block 410, the secondary container 118 transmits the modified second request 130 to a destination 314 other than an endpoint 136 of the second serverless function. For example, the destination 314 can be the routing node 104 or the authentication node 108 of FIG. 1. The destination 314 can be configured to cause the second serverless function 310 to be executed in response to receiving the modified second request 130 (e.g., in response to validating the digital signature 112 of the modified second request 130).

The destination 314 can cause the second serverless function 310 to be executed in any suitable manner. For example, the destination 314 can generate a third request in response to validating the digital signature 112 of the modified second request 130. The third request can include the identifier 312 usable for invoking the second serverless function 310 and another digital signature (e.g., a second digital signature) that is different from the digital signature 112 (e.g., a first digital signature) of the modified second request 130. The destination 314 can then transmit the third request to a routing node, such as routing node 104 of FIG. 1, for causing the second serverless function 310 to be executed.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A node comprising:
   a processor; and
   a memory device comprising instructions that are executable by the processor for causing the processor to perform operations including:
   detecting a first request associated with a first serverless function in a predefined sequence of serverless functions; and
   in response to detecting the first request, causing a secondary container to be deployed in a cloud computing environment, the secondary container being configured to:
   intercept a second request transmitted from a primary container configured to execute the first serverless function, the second request being configured to invoke a second serverless function in the predefined sequence of serverless functions;
   generate a modified second request based on the second request; and
   transmit the modified second request to a destination other than an endpoint of the second serverless function, the destination being configured to cause the second serverless function to be executed in response to receiving the modified second request.

2. The node of claim 1, wherein the predefined sequence of serverless functions is configured to implement at least part of a distributed application.

3. The node of claim 1, wherein the modified second request includes a digital signature generated using cryptographic information stored internally to the cloud computing environment.

4. The node of claim 3, wherein the destination is configured to:
receive the modified second request with the digital signature from the secondary container;
validate the digital signature; and
cause the second serverless function to be executed in response to validating the digital signature.

5. The node of claim 4, wherein the digital signature is a first digital signature, and wherein the destination is configured to cause the second serverless function to be executed in response to validating the first digital signature by:
generating a third request comprising (i) an identifier usable for invoking the second serverless function and (ii) a second digital signature that is different from the first digital signature; and
transmitting the third request to a routing node, the routing node being configured to invoke the second serverless function based on the identifier and in response to validating the second digital signature.

6. The node of claim 1, wherein the destination is an authentication node in the cloud computing environment, the authentication node being part of a messaging system for enabling nodes of the cloud computing environment to transmit messages to one another.

7. The node of claim 1, wherein the endpoint associated with the second serverless function is a second endpoint, and wherein causing the secondary container to be deployed in the cloud computing environment comprises:
generating a modified first request based on the first request; and
transmitting the modified first request to a first endpoint associated with the first serverless function, the first endpoint being configured to receive the modified first request and deploy the primary container and the secondary container together in a container pod based on a header of the modified first request.

8. The node of claim 1, wherein the node is a function router, the destination is within the cloud computing environment, and the endpoint is within the cloud computing environment.

9. The node of claim 1, wherein the modified second request includes an identifier usable to invoke the second serverless function, and the destination is configured to cause the second serverless function to be executed based on the identifier.

10. The node of claim 1, wherein the operations further include detecting the first request based on a webhook event triggered in response to the first request.

11. A computer-implemented method comprising:
detecting, by a processor, a first request associated with a first serverless function in a predefined sequence of serverless functions; and
in response to detecting the first request, causing, by the processor, a secondary container to be deployed in a cloud computing environment, the secondary container being configured to:
intercept a second request transmitted from a primary container configured to execute the first serverless function, the second request being configured to invoke a second serverless function in the predefined sequence of serverless functions;
generate a modified second request based on the second request; and
transmit the modified second request to a destination other than an endpoint of the second serverless function, the destination being configured to cause the second serverless function to be executed in response to receiving the modified second request.

12. The method of claim 11, wherein the predefined sequence of serverless functions is configured to implement at least part of a distributed application.

13. The method of claim 11, wherein the modified second request includes a digital signature generated using cryptographic information stored internally to the cloud computing environment.

14. The method of claim 13, wherein the destination is configured to:
receive the modified second request with the digital signature from the secondary container;
validate the digital signature; and
cause the second serverless function to be executed in response to validating the digital signature.

15. The method of claim 14, wherein the digital signature is a first digital signature, and wherein the destination is configured to cause the second serverless function to be executed in response to validating the first digital signature by:
generating a third request comprising (i) an identifier usable for invoking the second serverless function and (ii) a second digital signature that is different from the first digital signature; and
transmitting the third request to a routing node, the routing node being configured to invoke the second serverless function based on the identifier and in response to validating the second digital signature.

16. The method of claim 11, wherein the destination is an authentication node in the cloud computing environment, the authentication node being part of a messaging system for enabling nodes of the cloud computing environment to transmit messages to one another.

17. The method of claim 11, wherein the endpoint associated with the second serverless function is a second endpoint, and wherein causing the secondary container to be deployed in the cloud computing environment comprises:
generating a modified first request based on the first request; and
transmitting the modified first request to a first endpoint associated with the first serverless function, the first endpoint being configured to receive the modified first request and deploy the primary container and the secondary container together in a container pod based on a header of the modified first request.

18. The method of claim 11, further comprising detecting the first request based on a webhook event triggered in response to the first request.

19. A non-transitory computer-readable medium comprising program code that is executable by a processor for causing the processor to perform operations including:
detecting a first request associated with a first serverless function in a predefined sequence of serverless functions; and
in response to detecting the first request, causing a secondary container to be deployed in a cloud computing environment, the secondary container being configured to:

intercept a second request transmitted from a primary container configured to execute the first serverless function, the second request being configured to invoke a second serverless function in the predefined sequence of serverless functions;

generate a modified second request based on the second request, wherein the modified second request includes an identifier usable to invoke the second serverless function; and transmit the modified second request to a destination other than an endpoint of the second serverless function, the destination being configured to cause the second serverless function to be executed in response to receiving the modified second request and based on the identifier.

20. The non-transitory computer-readable medium of claim 19, wherein the identifier is a unique identifier of the second serverless function.

\* \* \* \* \*